(12) United States Patent
He et al.

(10) Patent No.: US 7,773,224 B2
(45) Date of Patent: Aug. 10, 2010

(54) SPECTRUM VERIFICATION IMAGING SYSTEM AND METHOD

(75) Inventors: Fan He, Gurnee, IL (US); Shumin Cheng, Vernon Hills, IL (US); Michael Frenzer, Palatine, IL (US); Bin Jiang, Vernon Hills, IL (US); Vahid Goudarzi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 231 days.

(21) Appl. No.: 11/863,424

(22) Filed: Sep. 28, 2007

(65) Prior Publication Data

US 2009/0086192 A1    Apr. 2, 2009

(51) Int. Cl.
*G01J 3/51* (2006.01)
(52) U.S. Cl. ............... 356/425; 356/402; 356/406; 356/419
(58) Field of Classification Search ........ 356/402, 356/419, 425
See application file for complete search history.

(56) References Cited

U.S. PATENT DOCUMENTS

| | | | |
|---|---|---|---|
| 4,455,087 A | 6/1984 | Allemand et al. | |
| 4,965,670 A | 10/1990 | Kinefelter | |
| 5,221,959 A | 6/1993 | Ohyama et al. | |
| 5,313,280 A | 5/1994 | Straus | |
| 5,327,782 A | 7/1994 | Sato et al. | |
| 6,772,151 B1 | 8/2004 | Johnston et al. | |
| 6,788,335 B2 | 9/2004 | Young et al. | |
| 7,171,039 B2 | 1/2007 | Mahon et al. | |
| 2003/0137655 A1 | 7/2003 | Wegmann | |
| 2004/0085277 A1 | 5/2004 | Yamaguchi et al. | |
| 2005/0162517 A1 | 7/2005 | Fujihara et al. | |
| 2006/0017924 A1 | 1/2006 | Kowarz et al. | |
| 2007/0091201 A1 | 4/2007 | Sasaki | |
| 2008/0002029 A1* | 1/2008 | He et al. ............ | 348/180 |

OTHER PUBLICATIONS

Scan-o-lite Color Matching Booth brochure, manufactured by Premier Colorscan.
Toshiba IK-TF2 3CCD video camera, as discussed in Advanced Imaging Magazine, Apr. 27, 2006, 04:39 PM PDT.
Verio Color Spectro data sheet, 2007.
X-Rite MA68II data sheet, 2007.
X-Rite Veri Color data sheet.
Kikuze Intelligent Color Calibration System (ICCS) data sheet, Sep. 2003.
*Shenyang Imatech, Inc. FRT2005*.

(Continued)

*Primary Examiner*—F. L Evans (57) ABSTRACT

A system (200) and method (800) for determining whether a sample object (203) has a color that is within a predetermined range is provided. The system (200) includes a light source (201) capable of projecting lights having different light wavelength spectrum upon the sample object (203). A controller (222) causes the light source (201) to project a first light wavelength spectrum upon the sample object (203), then another, then another, and so forth. While each light is projecting upon the object, a monochromatic image capture device (202) captures an image having luminous intensity information. The luminous intensity information, or a subset thereof selected by an image selection tool (232) is then compared to the statistical range, which is derived from a plurality of images taken of a reference object (403).

20 Claims, 10 Drawing Sheets

OTHER PUBLICATIONS

Virany, Leslie R., "Non-Final Office Action", U.S. Appl. No. 11/427,715, filed Jun. 29, 2006, Fan He inventor, Mailed Mar. 9, 2009.

Virany, Leslie R., "Non-Final Office Action", U.S. Appl. No. 11/427,715, filed Jun. 29, 2006, Fan He inventor, Mailed Sep. 16, 2009.

* cited by examiner

SPECTRUM VERIFICATION IMAGING SYSTEM AND METHOD

BACKGROUND

1. Technical Field

This invention relates generally to an imaging system for verifying light reflection spectrum from a sample object, and more specifically to an imaging system using a monochromatic image capture device and a plurality of colored light sources to verify that the color of an object is within a specified range.

2. Background Art

Modern electronic devices often come in complex mechanical housings constructed from multiple parts. By way of example, many commonly available portable video cameras now include LCD screens that flip, rotate, and twist away from the housing. Doors pop open to accept discs and memory cards, and detachable lights, microphones, and remote control devices snap to and from the camera. Similarly, many mobile telephones are available with "flip" housings that open like a clamshell. Each half of the clamshell may include multiple parts, such as housing bottoms, housing tops, sides, doors, latches, windows, and so forth.

Each part used in the assembly of the electronic device is generally manufactured in batches that are separate from the others. For instance, a group of doors may be made from one batch of plastic. A group of housing bottoms may then be manufactured from metal and painted. The components are then brought together and assembled on a manufacturing line to form the finished product.

A problem associated with the manufacture of multi-part devices is that of matching color. End users expect the colors of the various housing parts to match. If, for example, a metal housing that has been painted is a slightly different shade of red than the plastic door attaching to it, the overall appearance of the device can be compromised.

Prior art solutions for color matching, including those described in U.S. Pat. No. 5,593,990, require a technician to compare—with the human eye—multiple parts to a standard swatch. If the part or sample "looks" the same as the swatch to the technician, the sample is passed. If it looks different, it fails.

The problem with this prior art solution is that it is based on the human eye, which is unique to the individual. A quality control technician in China will not have the same eye as one in South America. Consequently, when a manufacturing process is global, components of differing hues may ship as the same stock color. Worse, devices may ship with mismatching parts.

There is thus a need for an improved method of spectrum verification.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As noted above, matching color is a difficult task in many manufacturing processes. The problem is exacerbated in the manufacture of portable electronic devices due to their shapes and finishes. The sleek contours and subtle curvatures of mobile devices like mobile telephones, which impart a stylistic appearance, reflect light differently from different places. These curves and contours make the problem of color detection incredibly difficult, as they alter the reflection properties of the overall device.

Figure 1:
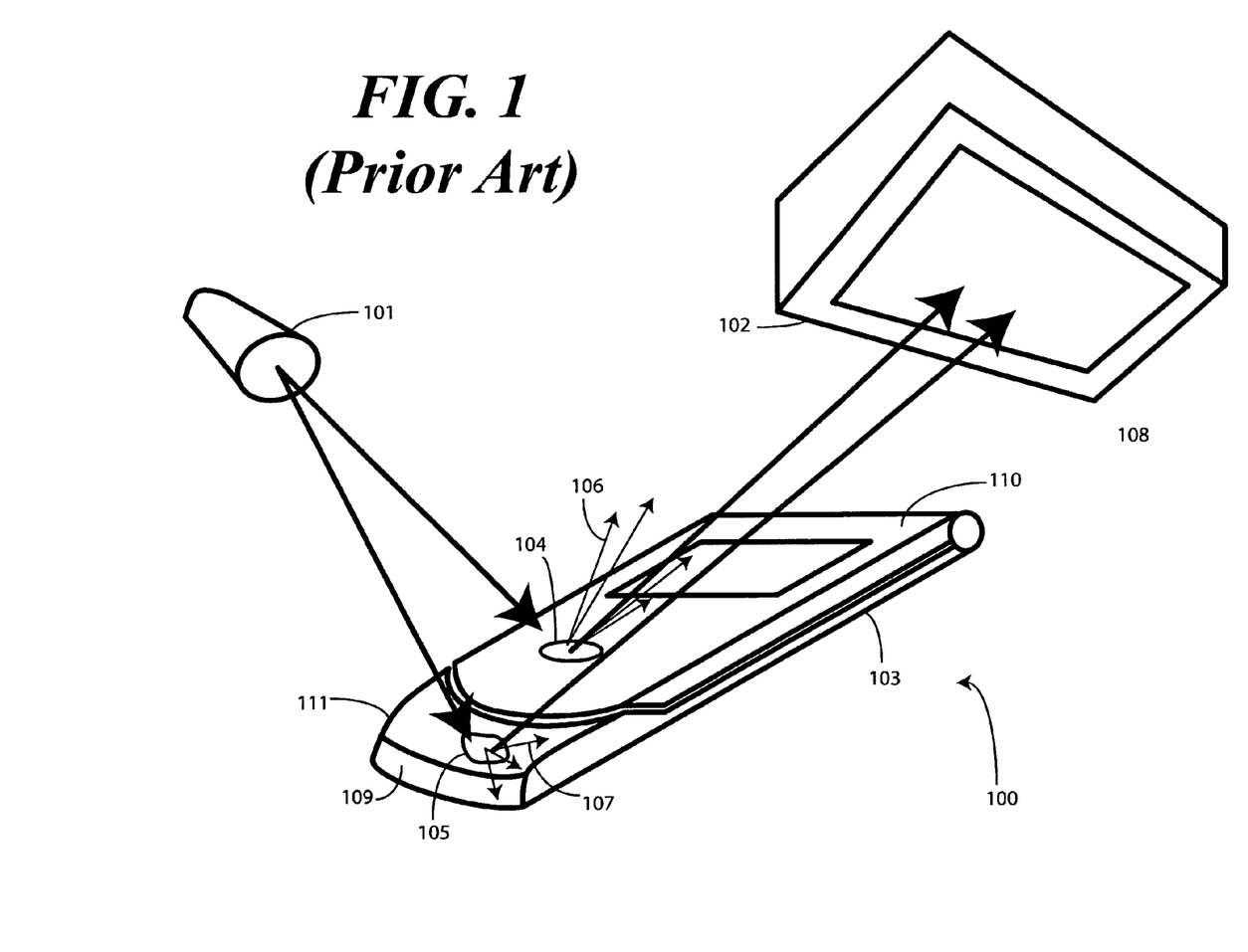
FIG. 1 illustrates a prior art color verification system

Turning now to FIG. 1, illustrated therein is one prior art color verification system 100. A uniform light source 101—such as a generally diffuse white light—projects light upon a sample object 103, shown here for illustrative purposes as a mobile telephone. The mobile telephone shown in FIG. 1 is a flip style phone having a bottom housing 109 and a top housing 110. These housings 109,110, each of which may be manufactured from multiple parts, may have curves 111 or other contours across the device. A consumer purchasing a uniformly colored device expects the bottom housing 109 and the top housing 110 to match.

The light source 101 projects light off the sample object 103 to a color detector 102. One example of such a color detector is the MA68II Portable Multi-Angle Spectrophotometer manufactured by Xrite. Such a device takes in light reflected off an object and performs a spectral analysis on the light to yield a reading of color in CIE L* a* b* color space.

The problem with such a system 100 is that the curves 111 and contours of the device transmit light differently to the detector 102. Some sections 104 of the device are highly reflective. Such sections 104 tend to reflect light strongly. This reflected light 106 is predominantly an image of the light source 101. Metallic finishes may compound this reflection issue.

Meanwhile, other sections 105 of the sample object 103 are highly diffuse. These sections 105 tend to disperse light in a diffuse manner. The diffuse light 107, also seen by the detector 102, gets averaged with the reflected light 106 when sensing color. This "average color" generally does not have sufficient granularity to determine whether the color of the top housing 110 matches the color of the bottom housing 109. Further, as the detector 102—which is portable—is moved, the amount of reflective light 106 and diffuse light 107 received by the sensor 108 on the detector 102 changes, again complicating color sensing. To further complicate matters, some color detectors 102 employ color filter arrays atop their image sensors. If these filters are not precisely matched, color verification is further compromised.

The inability to match color greatly affects manufacturing processes. First, scrap parts increase as parts fail due to the inability to verify whether the colors match. Second, if mismatched parts ship, consumers may return the devices, increasing the overall cost of manufacture. Third, the inability to match color may result in increased engineering and development cycle time, as engineers must attempt to select colors and processes that are more easily matched—a process that can result in fewer color options for consumers.

Figure 2:
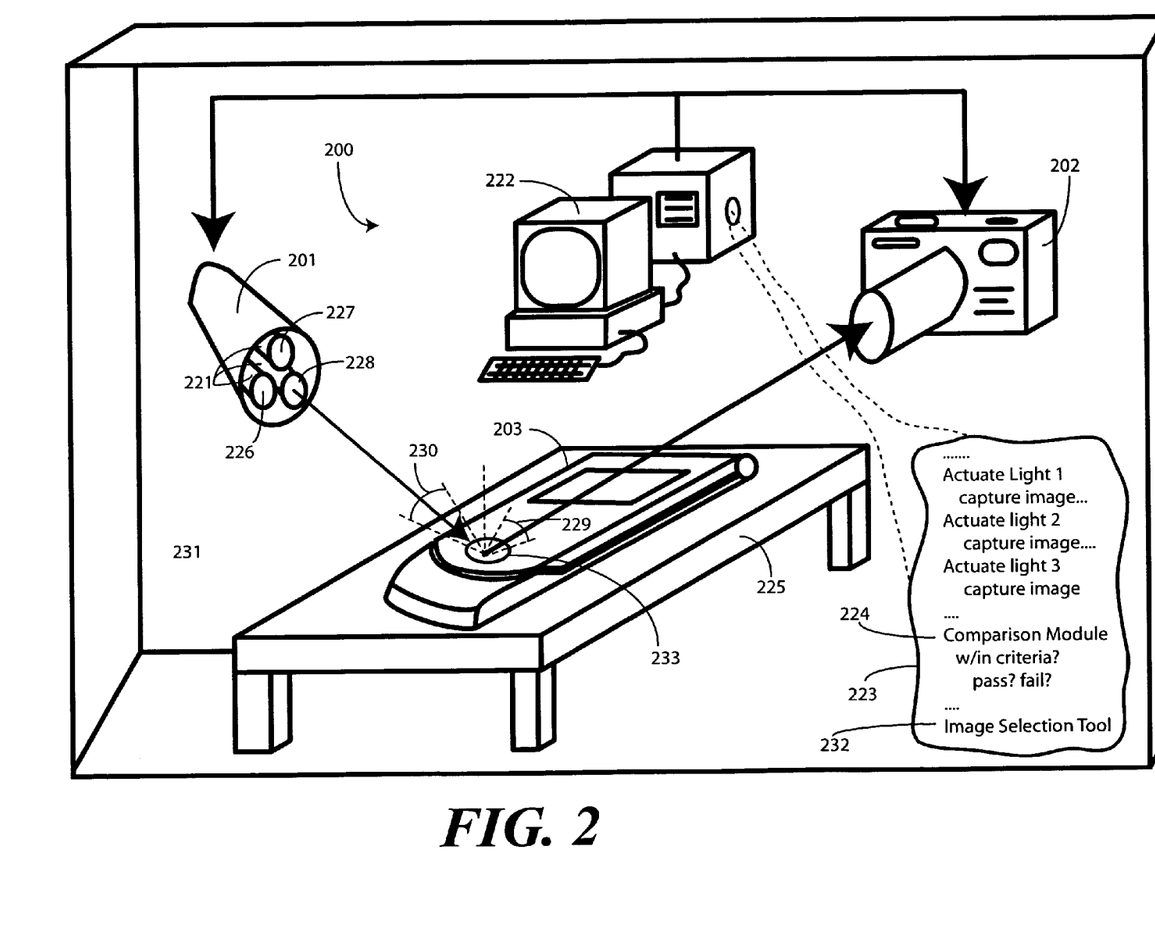
FIG. 2 illustrates one embodiment of a spectrum verification imaging system in accordance with the invention.

Turning now to FIG. 2, illustrated therein is one embodiment of a system 200 for determining whether a color of a sample object 203 is within a predetermined color range in accordance with the invention. The system 200 includes a light source 201, a monochromatic image capture device 202, a controller 222, and a mounting device 225. The monochromatic image capture device 202 captures monochromatic images—such as black and white images—of the sample object 203 as different colors of light are projected on the sample object 203 by the light source 201. The controller 222 then compares the luminous intensity information retrieved from a sensor in the monochromatic image capture device 202 with a statistical range derived from a plurality of images of a reference object to determine whether the color of the sample object 203 is within the predetermined range.

The controller 222 serves as the nerve center of the system 200. One example of a device suitable for use as the controller 222 is a computer with sufficient memory and processing capability to execute software algorithms that are discussed below. In one embodiment, the controller 222 executes software stored in memory to cause the light source 201 to project a particular color of light on the sample object 203. The controller 222 then causes the monochromatic image capture device 202 to digitize at least a selected region of the sample object 203. A comparison module 224, which may be software stored within the controller 222, then uses statistical analysis—such as six-sigma methodology—to determine whether the color of the sample object 203 fits within the predetermined range. A personal computer having a Pentium microprocessor, manufactured by Intel Inc., is one example of a device that may be used for the controller. Equivalent personal computers, such as those manufactured by Apple, Hewlett Packard, Dell, and others may also be used. Alternatively, a purveyor of the system may create custom logic or processing systems that operate as the controller.

A monochromatic image capture device 202 is coupled to the controller. The monochromatic image capture device 202 is designed to capture images of the sample object 203 without the use of internal color filtering. One example of a suitable monochromatic image capture device 202 is a 1 to 8 megapixel black and white digital camera having an electronic image sensor, such as a CCD or CMOS sensor. The image sensor need not be necessarily black and white, but should be devoid of internal color filters having mismatched spectral transmission properties. For instance, a particular application may require that the monochromatic image capture device 202 include a single filter—such as a UV or infrared filter. Such an assembly is still a monochromatic image capture device in that the sensor is not filtered by different, spectrally mismatched internal filters. In any event, the monochromatic image capture device 202 is configured to capture images that include luminous intensity information about the sample object 203.

A light source 201 is coupled to the controller 222 and is configured to selectively project one of a plurality of predetermined light wavelength spectra, or colors, on the sample object 203. In one embodiment, the light source 201 comprises a plurality of LEDs 221, with each LED having a predetermined wavelength spectrum associated therewith. For example, the light source 201 may include a first (e.g. red) LED 226, a second (e.g. green) LED 227, and a third (e.g. blue) LED 228. The light source 201 may include more than three colors. For instance, the light source 201 may be capable of projecting four, five, or more colors upon the sample object 203. Additional colors, such as yellow, magenta, cyan, light blue, or other colors may be selected depending upon the application.

Using LEDs in the light source 201 offers significant advantages when compared with the color filters commonly used in color cameras and spectrometers. LED's have spectral responses that are both centered very accurately on the target frequency and have very little spectral response at other frequencies. By being able to tightly control the spectral content of the light source the image sensing system (200) can make much more accurate readings of the color of the device under test. By contrast, color filters commonly used in color cameras and spectrometers have poor spectral characteristics. These filters allow considerable light to pass in the undesired frequency bands while sometimes partially attenuating light in the desired bands. Such filters often have considerable spectral overlap. Overall this makes it very difficult for the color measurement systems employing these color filters to make precise color measurements.

Figure 10:
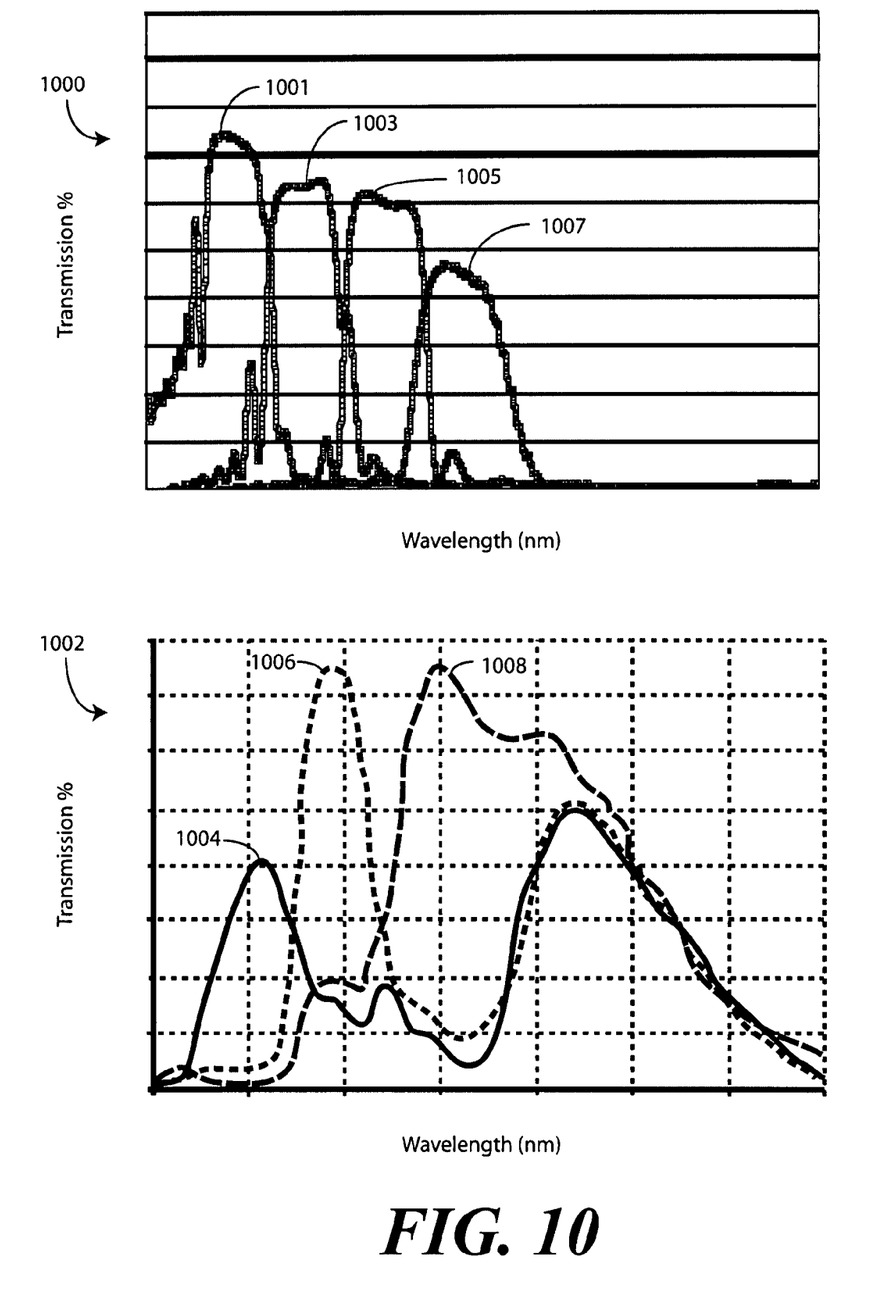
FIG. 10 illustrates a comparison of wavelength spectra corresponding to a light source in accordance with the invention as compared to wavelength spectra of common color image capture devices.

Turning briefly to FIG. 10, illustrated therein is a graph 1000 of the transmission percentages versus wavelength for LEDs suitable for use with the invention. As can be seen, each LED has a spectral response that is centered about its target frequency and is roughly the same as that of the other LEDs. For example, the transmission properties of a dark blue LED 1001, a light blue led 1003, a red LED 1005, and a purple LED 1007, are roughly the same and generally do not overlap. Each LED exhibits very little color cross talk with the others, and there is high spectrum resolution.

By contrast, a graph 1002 illustrates transmission percentages versus wavelength for filters commonly used in color image capture devices. There is large color cross talk. Further, there are generally only three color bands in the sensor filters found in many color image capture devices. As can be seen, the transmission percentages of the blue filter 1002, the green filter 1004, and the red filter 1006 are dramatically different. Additionally, each overlaps the other substantially.

Figure 3:
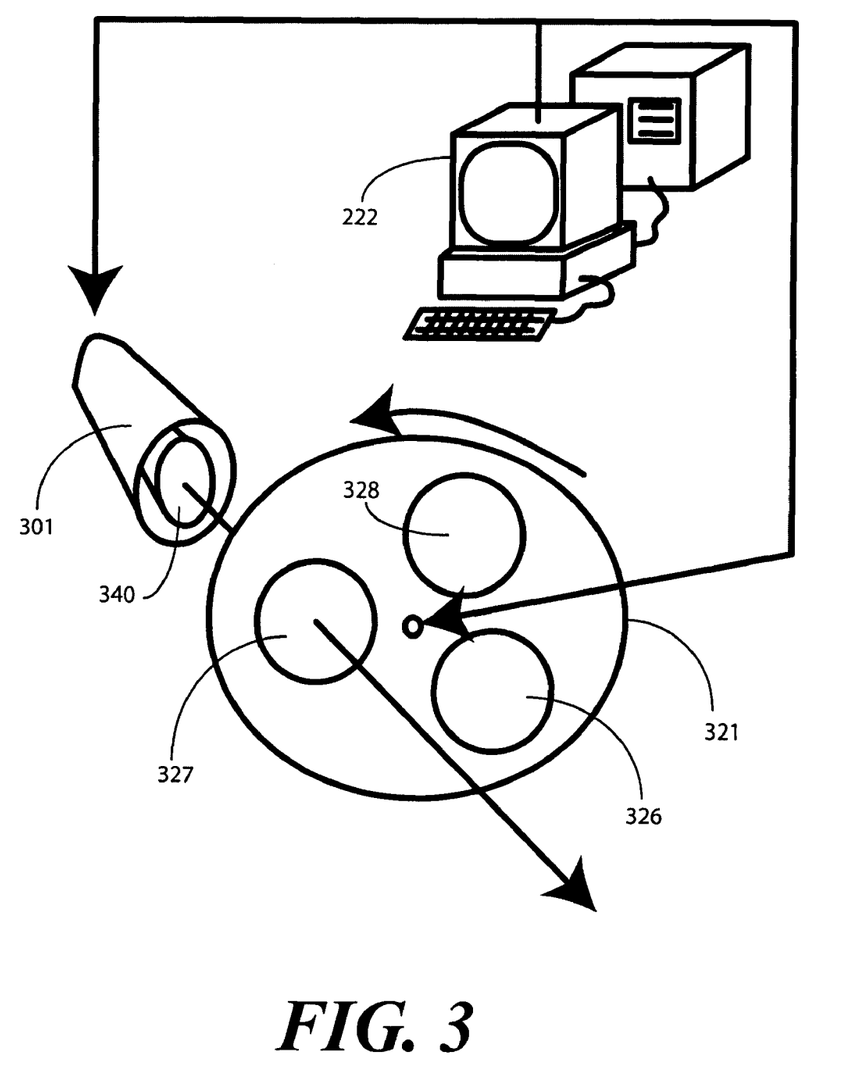
FIG. 3 illustrates one embodiment of a light source for use with a verification imaging system in accordance with the invention.

Turning briefly to FIG. 3, illustrated therein is an alternate light source 301 suitable for use with embodiments of the invention. The light source 301 of FIG. 3 employs a neutral light 340, such as a white light that has a generally uniform output across the visible spectrum. A plurality of color filters 321 is then provided to alter the color of light projected upon the sample object (203). In one embodiment, each filter has a predetermined filter wavelength spectrum or color associated therewith that is different from the others. A first filter 326 may be red, while a second filter 327 may be blue, while a third filter 328 may be green, and so forth. In the embodiment of FIG. 3, the controller 222 causes the plurality of filters 321 to rotate so as to cause the light emanating from the neutral light 340 to change color. In another embodiment, tunable liquid crystal filters are employed. Each filter can be tuned within a predetermined wavelength range. For instance, the first filter 326 may be a red filter configured to be tuned in a range between 600 nm to 700 nm in five graduated steps, the second filter 327 may be a blue filter configured to be tuned in a range of between 400 nm and 500 nm, while the third filter 328 may be a green filter capable of being tuned within a range of 500 nm and 600 nm.

An advantage of using either tunable or fixed filters with the light source 301 is that high-end, professional, spectrally-matched filters may be used having well-controlled spectral characteristics. Most color image capture devices are unable to use these filters because they are too large and too expensive for such applications. This allows the monochromatic image capture device (202) to capture images of the device being illuminated with well-controlled colors without the wild variances associated with the filtering systems in color cameras and image capture devices.

Turning now back to FIG. 2, the controller 222 includes a plurality of modules, each of which may be software coded and stored within memory so as to be operable with the controller's processor. A first module is the image capture module 223. By executing the image capture module 223, the controller 222 is configured to cause the monochromatic image capture device 202 to capture at least a first image of the sample object 203 while the light source 201 projects a first color or wavelength spectrum upon the sample object 203. This may be achieved, for instance, by actuating the first LED 226 and capturing a picture with the monochromatic image capture device 202 while the first LED 226 is ON.

The image capture module 223 then causes the controller 222 to capture a second image of the sample object 203 while the light source 201 projects a second color or wavelength spectrum upon the sample object 203. This may be achieved, for instance, by actuating the second LED 227 and capturing a picture with the monochromatic image capture device 202 while the second LED 227 is ON.

While two pictures provides one level of color matching quality, experimental testing has shown that three or more pictures of the object increases the level of quality in color matching. As such, the image capture module 223 may then cause the controller 222 to capture a third image of the sample object 203 while the light source 201 projects a third color or wavelength spectrum upon the sample object 203. As with the first and second images, this may be achieved, for instance, by actuating the third LED 228 and capturing a picture with the monochromatic image capture device 202 while the third LED 228 is ON. Note that four, five, or more images, each taken with a different color or wavelength spectrum emanating from the light source, may also be captured to further refine the granularity of matching within the system 200.

Once these images have been captured, the luminous intensity information associated with each image is transferred to the controller 222 and stored in memory. As the monochromatic image capture device's sensor is made up of pixels that sense incident light, in one embodiment this luminous intensity information is transmitted to the controller 222 as a binary value between 0 and 256.

A comparison module 224 is then configured to determine whether the sample object's luminous intensity information, as taken from the images, satisfies at least one criterion based upon predetermined reference luminous intensity data. As will be described in more detail below, in one embodiment the predetermined reference luminous intensity data comprises a statistical analysis of images taken of a reference sample having a reference color. Said differently, the predetermined reference luminous intensity data comprises calibration data received from a plurality of images of a reference object having a representative reference color. By way of example, to provide a statistically relevant sample, during a calibration process 30 or more images may be taken of a reference object while being illuminated by the first LED 226. The controller 222 then performs a statistical analysis on this set to determine a range of acceptability for sample objects illuminated by the first LED 226. The comparison module 224 is configured to determine whether a sample image, or rather the luminous intensity information taken from that sample image, fits within this predetermined acceptable range.

To ensure that the position of the light source 201 and the monochromatic image capture device 202 stay constant between the images of the reference object and the images of the sample object 203, a mounting device 225 is provided. In one embodiment, the mounting device is a fixed jig configured to hold either the reference object or sample object such that light projected from the light source 201 reflects off the sample object 203 and to the monochromatic image capture device 202 at an angle that is substantially similar to the angle that existed when the image of the reference object was taken. Further, by disposing the mounting device 225 at a fixed location relative to the light source 201 and the monochromatic image capture device 202, a line operator may ensure that the spatial relationship between the light source 201, the monochromatic image capture device 202, and the sample object 203 stays substantially the same from sample object to sample object. In short, the mounting device 225 ensures that the sample object 203 is positioned at a constant location relative to the light source 201 and the monochromatic image capture device.

For better result control, an enclosure 231 may be disposed about system 200. The enclosure 231, which is positioned about the light source 201, the mounting device 225, and the monochromatic image capture device 202, is configured to prevent ambient light from the surrounding environment from illuminating the sample object 203. As mentioned above, in one embodiment, the various colors or wavelength spectra of the light source are precisely selected. To avoid corruption, the enclosure 231, which may be opaque plastic or metal, prevents stray light from the room or manufacturing floor from altering the colors of the light source 201. Note that the controller 222 may be placed outside the enclosure 231 as desired.

Recall from above that a sample object 203 having curves and contours may have reflective sections and diffuse sections. To eliminate the issue of diffuse regions and reflective regions, the controller 222 includes an image selection tool 232. The image selection tool 232 is configured to facilitate selection of a subset of an image that corresponds to a subset 233 of the surface are of the sample object 203. As the image captured by the monochromatic image capture device 202 comprises a plurality of pixels, the image selection tool 232 allows an operator to select a subset of pixels so as to examine luminous intensity data only from the subset 233 of the sample object 203. An engineer or technician generally selects the subset 233 by eye during the calibration process. When using a single monochromatic image capture device 202, the engineer or technician may take care to avoid certain regions. The engineer will have the option of picking any type of region, and some may be more attractive than others, depending upon the application. By way of example, with a common finish found on electronic devices, the engineer may select a diffuse region for analysis. In other embodiments, depending upon application, a mixed diffuse/reflective region may be selected for analysis via the image selection tool 232. Note that for other embodiments described below, where for instance multiple monochromatic image capture devices are employed, reflective and diffuse regions may be selected.

While the light source 201 and the monochromatic image capture device 202 may be placed at any variety of angles relative to the sample object 203, depending upon application, experimental testing has shown that improved results are achieved when both the monochromatic image capture device 202 and the light source 201 are placed at angles 229,230 of between 30 and 60 degrees relative to the sample object 203. Performance may be further improved when both the monochromatic image capture device 202 and the light source 201 are placed at angles 229,230 of generally 45 degrees relative to the sample object 203.

Figure 4:
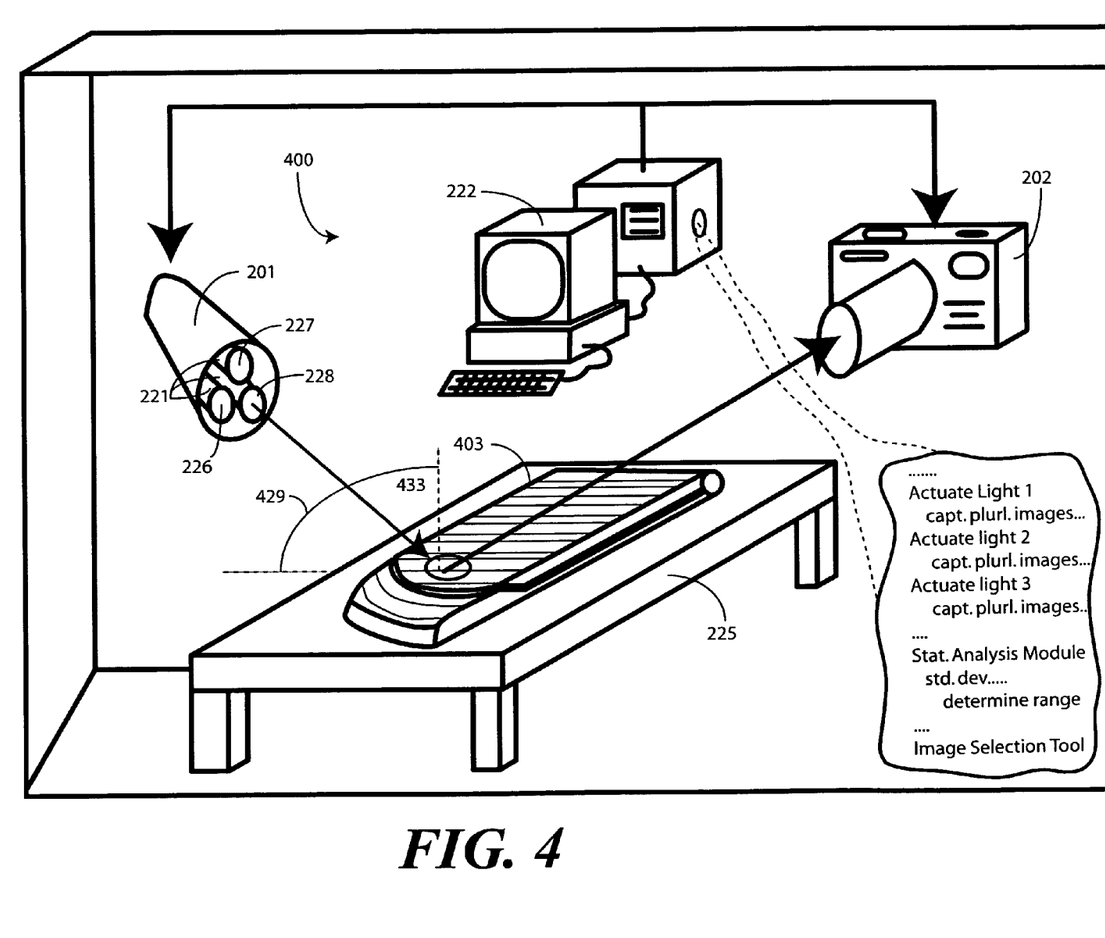
FIG. 4 illustrates one embodiment of a spectrum verification imaging system during calibration in accordance with the invention.

Turning now to FIG. 4, illustrated therein is one embodiment of a system 400 for determining whether a color of a sample object is within a predetermined color range, in a calibration set-up configuration in accordance with the invention. The system 400 of FIG. 4 is similar to the system (200) of FIG. 2, with a few exceptions. The primary difference is that in the system 400 of FIG. 4, a reference object 403 has been placed in the mounting device 225, rather than the sample object (203) of FIG. 2.

The reference object 403 has a reference color (indicated by the slash lines running across the reference object 403) that is used as a standard against which production objects are compared. In one embodiment, the reference object 403 forms the basis upon which the predetermined reference luminous intensity data is derived. Reference objects may be manufactured under tight tolerances at a headquarter location, for example, and then shipped to manufacturing plants around the world so that the various systems may be calibrated properly.

While the reference object 403 may be a swatch, such as a plastic, cardboard, or metal sample piece of material in the representative color, in one embodiment the reference object 403 is a sample part having the same curves and contours that production objects will have. By using such an object, light projected from the light source 201 will reflect in the same way off the reference object 403 as from a production or sample object (203). When light reflects in a similar manner, the system 400 may be configured such that the light source 201 and monochromatic image capture device 202 are aligned so that light captured by the monochromatic image capture device 202 suits the application, i.e. it may be a diffuse region, a reflective region, or a mixed diffuse/reflective region.

When the system 400 is to be calibrated, an engineer or technician first places the reference object 403 in the mounting device 225. The engineer or technician then actuates the light source 201 such that each of the plurality of LEDs 221 (or the plurality of filters (321) if that configuration is being used) sequentially projects light upon the reference object 403. The engineer or technician then visually inspects the reference object 403, from the perspective of the monochromatic image capture device 202, to select a region 433 of the device from which to perform the calibration analysis. Often this region 433 will be one that is neither too diffuse nor too reflective. As will be explained in more detail below, there may be applications where reflective or diffuse regions are purposely selected. However, in one embodiment—when using a single monochromatic image capture device 202—more color information may be gleaned when the region 433 selected is neither too diffuse nor too reflective. Once this region 433 has been selected, the light source 201 is fixed such that its angle 430 relative to the mounting device 225 is constant. Similarly, the monochromatic image capture device 202 is fixed in place such that the angle 429 between it and the mounting device 225 remains constant.

The engineer or technician then takes a series of images of the reference object 403 with each light source and stores the luminous intensity associated with the series in memory in the controller 222. These series of luminous intensity information values may then be used to calculate predetermined ranges against which sample objects 203 will be compared. By way of example, when using three LEDS, with one red, one blue, and one green, a series of images will be captured while the first LED 226 is ON. A second series of images will be captured while the second LED 227 is ON, and a third series of images will be captured while the third LED 228 is ON. These images will then be used for calibration as is described below in reference to FIG. 9.

Note that when the system is in the field, a production sample may be used for calibration. Such may be the case, for example, where LEDs are being used as a light source and one of the LEDs "burns out" or otherwise fails. When this occurs, and the LED is replaced, a mini-calibration may occur. A technician, for example, may look at the last three or four production samples that were tested to determine if one fell relatively in the middle of the predetermined range. Where one is found, this sample may be used to calibrate the system for the new LED as described above.

Figure 5:
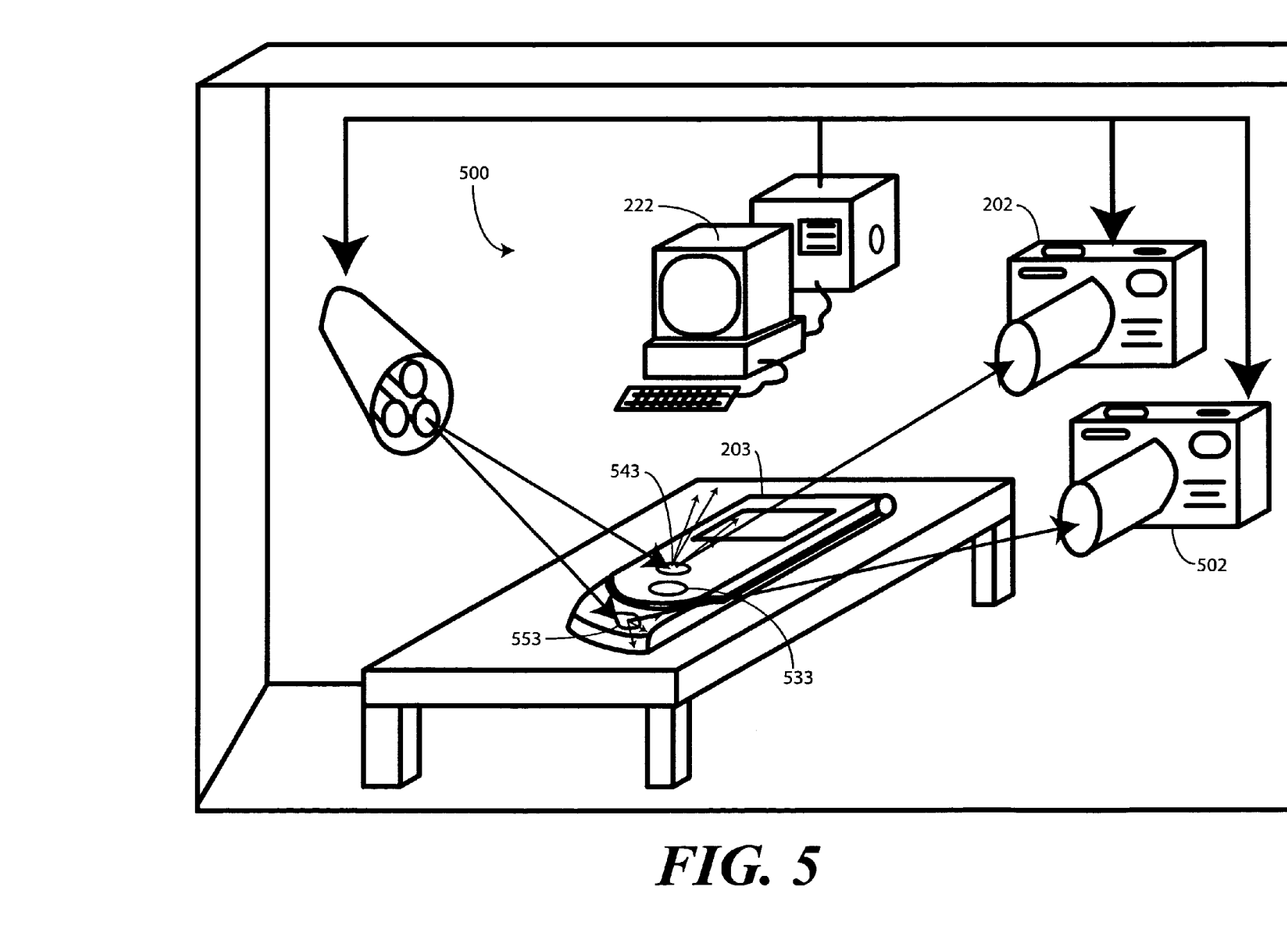
FIG. 5 illustrates an alternate embodiment of a spectrum verification imaging system in accordance with the invention.

Turning now to FIG. 5, illustrated therein is another system 500 for determining whether the color of a sample object 203 is within a predetermined range in accordance with the invention. In the embodiment of FIG. 5, two monochromatic image capture devices 202,502 are used, rather than one as shown in FIG. 2. While two image capture devices are shown in FIG. 5, it will be obvious to those of ordinary skill in the art having the benefit of this disclosure that the invention is not so limited. Three, four, or more image capture devices may also be used. With each image capture device comes more luminous intensity information. The tradeoff, of course, is the cost of the image capture devices.

In the system 500 of FIG. 5, two monochromatic image capture devices 202,502 allow the system 500 to capture different types of information. Rather that selecting a single region 533, for example one that is diffuse, the system 500 allows the capture of luminous intensity information from both reflective and diffuse regions 543,553. This may be beneficial, for example, where the sample object 203 has a multi-layer finish. To ensure that consumers see the same color when light is reflecting off curves and contours, the user of the system may wish to check whether luminous intensity data from these regions 543,553 is within a predetermined calibration range taken from the same regions of the reference object.

Figure 6:
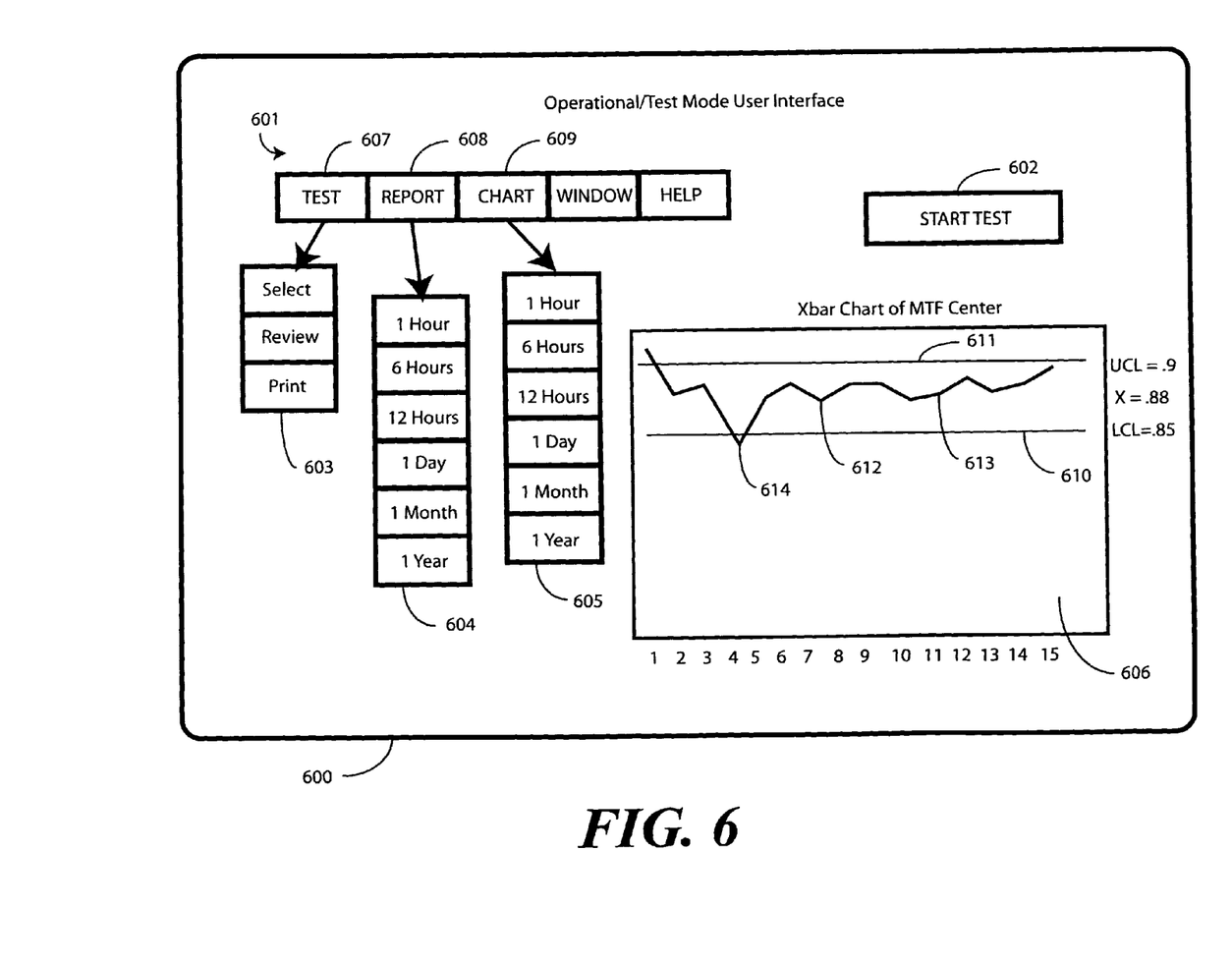
FIG. 6 illustrates one embodiment of a user interface display for a spectrum verification imaging system in accordance with the invention.

Turning now to FIG. 6, illustrated therein is one embodiment of a user interface 600 suitable for use with embodiments of the invention. The user interface 600 is exemplary of that which might be seen on the display of the controller (222) of FIG. 2. The user interface 600 of FIG. 6 is an operational or test mode user interface. A calibration interface will be described with reference to FIG. 7.

The exemplary user interface 600 includes a plurality of pull-down menus 601, each of which may be used as a controller interface to execute the operations of the controller 222. By way of example, the plurality of pull-down menus 601 in FIG. 6 includes a test menu 607, a report menu 608, and a chart menu 609. An action icon 602 is used to initiate testing.

The test menu 607 has an associated test drop-down menu 603, which includes select, review, and print options. Similarly, the report menu 608 includes an associated report drop-down menu 604, which allows the user to select a window of test data to view numerically. The chart menu 609 includes an associated chart drop-down menu 605, which allows the user to select a window of test data to view graphically.

In the illustrative view of FIG. 6, the user has selected a one-hour snapshot to view graphically by clicking (with a mouse coupled to the controller (222)) on the chart menu 609 and selecting the "1 hour" option from the associated chart drop-down menu 605. A charted graphic 606 then appears, showing fifteen samples that have been tested. Many samples, e.g. samples 612,613, fall within the upper limit 611 and lower limit 610 of the predetermined reference data. These samples 612,613 therefore sufficiently match the reference object (503) and pass. However, two of the samples, e.g. sample 614, have fallen out of the predetermined range. Such samples do not match the reference object (503), and therefore are not allowed to ship to customers.

For simplicity, the illustrative user interface 600 of FIG. 6 shows one charted graphic 606. This may be, for example, the graphic associated with the red LED being illuminated. Where three LEDs are used, three graphics will generally be presented—one for each LED. In so doing, a user may look at each sample to see whether the sample object fell within the predetermined range for that color of light. Sophisticated testing algorithms may permit some colors to fall outside the predetermined range. By way of example, it may be determined that when testing a turquoise sample object with three images from a red LED, green LED, and blue LED, respectively, the data associated with the red and blue LEDs must be within in the range. However, when the data associated with the green LED is slightly outside of the range, the turquoise sample object still "looks" sufficiently turquoise as to be shipped. Said differently, some sophisticated algorithms could, for example, make pass/fail decisions based on formulas that equally, or unequally, combine the measurements made with each of the different wavelengths projected by the light source. Other test criteria, however, may require that all three (or four or five, as the case may be) colors be within the predetermined range.

In an alternative embodiment, multiple color data may be presented on a single graphic. As will be described in more detail below, statistical analyses may be performed on calibration data of luminous intensity information taken from a plurality of images of a reference object. While images from each color (of light projected on a sample object) may be compared to a range determined from similar images, one may be able to compare multiple images to a standard range in a single graphic.

Suppose, for example, that a light source capable of projecting two different light wavelength spectrum—blue and green—were used in testing. From calibration data, an acceptable range may be where in accordance with the formula—(Blue Image Luminous Intensity−2*Green Luminous Intensity+2). Where this result is less than zero, the sample passes. Where the result is greater than zero, the sample fails. This example is illustrative only, as the statistically permissible range will vary depending upon object, light source, and application.

Figure 7:
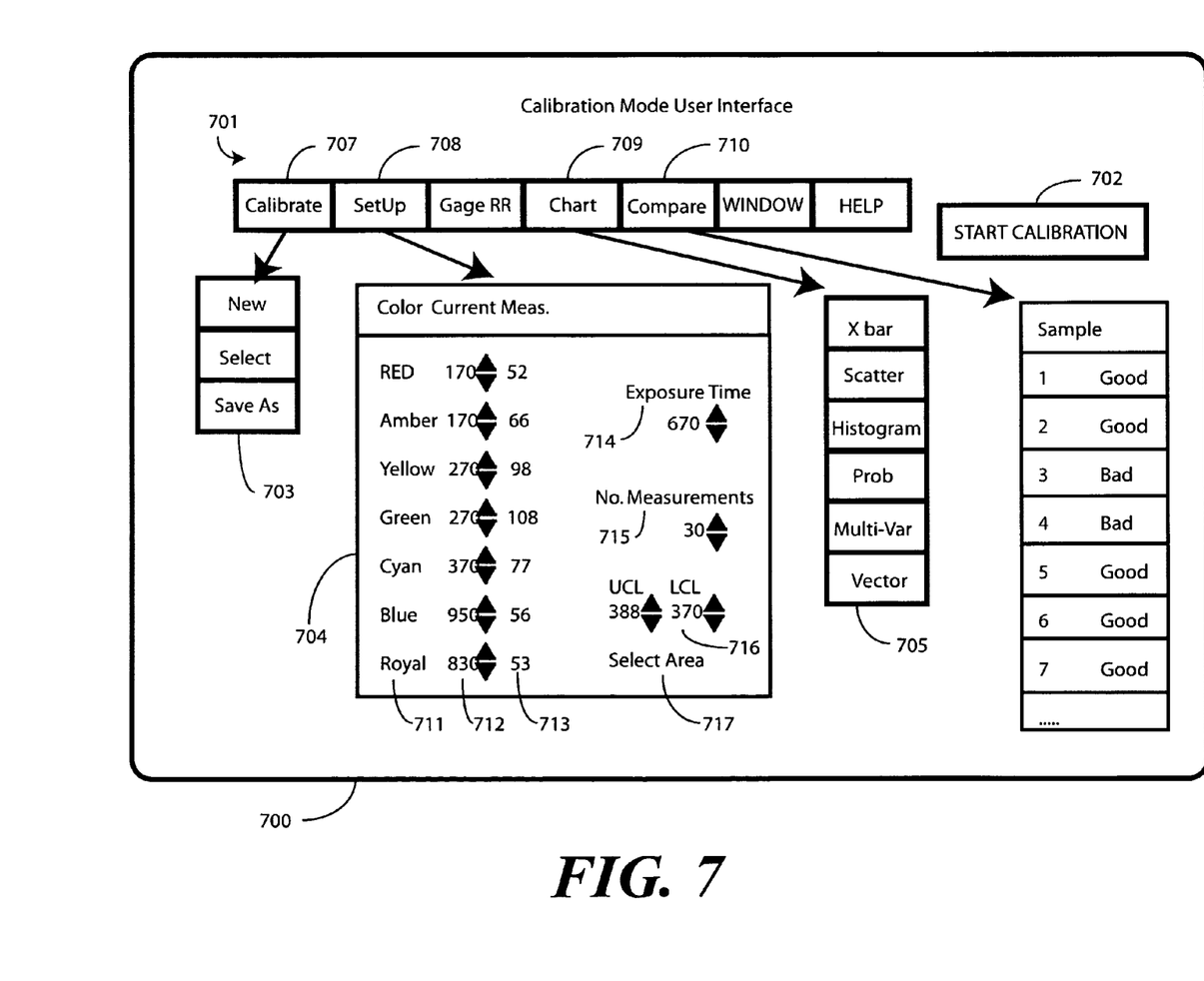
FIG. 7 illustrates one embodiment of a user interface display for a spectrum verification imaging system during calibration in accordance with the invention.

Turning now to FIG. 7, illustrated therein is an exemplary calibration user interface 700 suitable for use with embodiments of the invention. As with the test user interface (600), the calibration user interface 700 includes a plurality of pull-down menus 701. In the illustrative embodiment of FIG. 7, these menus include a calibrate menu 707, a setup menu 708, a chart menu 709, and a comparison menu 710. An action icon 702 is included to cause the controller (222) to actuate the calibration process.

The calibrate menu 707 includes an associated calibrate drop-down menu 703, which includes new file, select file to open, and save file as options. The chart menu 709 includes a chart drop-down menu 705 that allows the engineer or technician to view various plots of the calibration data.

The setup menu 708 includes an associated setup drop-down menu 704. The setup drop-down menu 704 allows a technician or engineer to input or read calibration data. In the illustrative embodiment of FIG. 7, this data includes the various colors 711 of light that the light source (201) is configured to project, the amount of current 712 (in the case of an LED) that the controller (222) uses to drive that particular light source, the reading 713—in units of luminous intensity—of each light source by the monochromatic image capture device (202) off the reference object (403), the exposure time 714 of the monochromatic image capture device (202), the number 715 of images captured, and the upper and lower current limits 716 for the particular LED being reviewed. Note also that there is an icon 717 that invokes the image selection tool (232) for selecting a subset of the image to measure, as discussed above. Each of these inputs may be adjusted as the application dictates.

Figure 8:
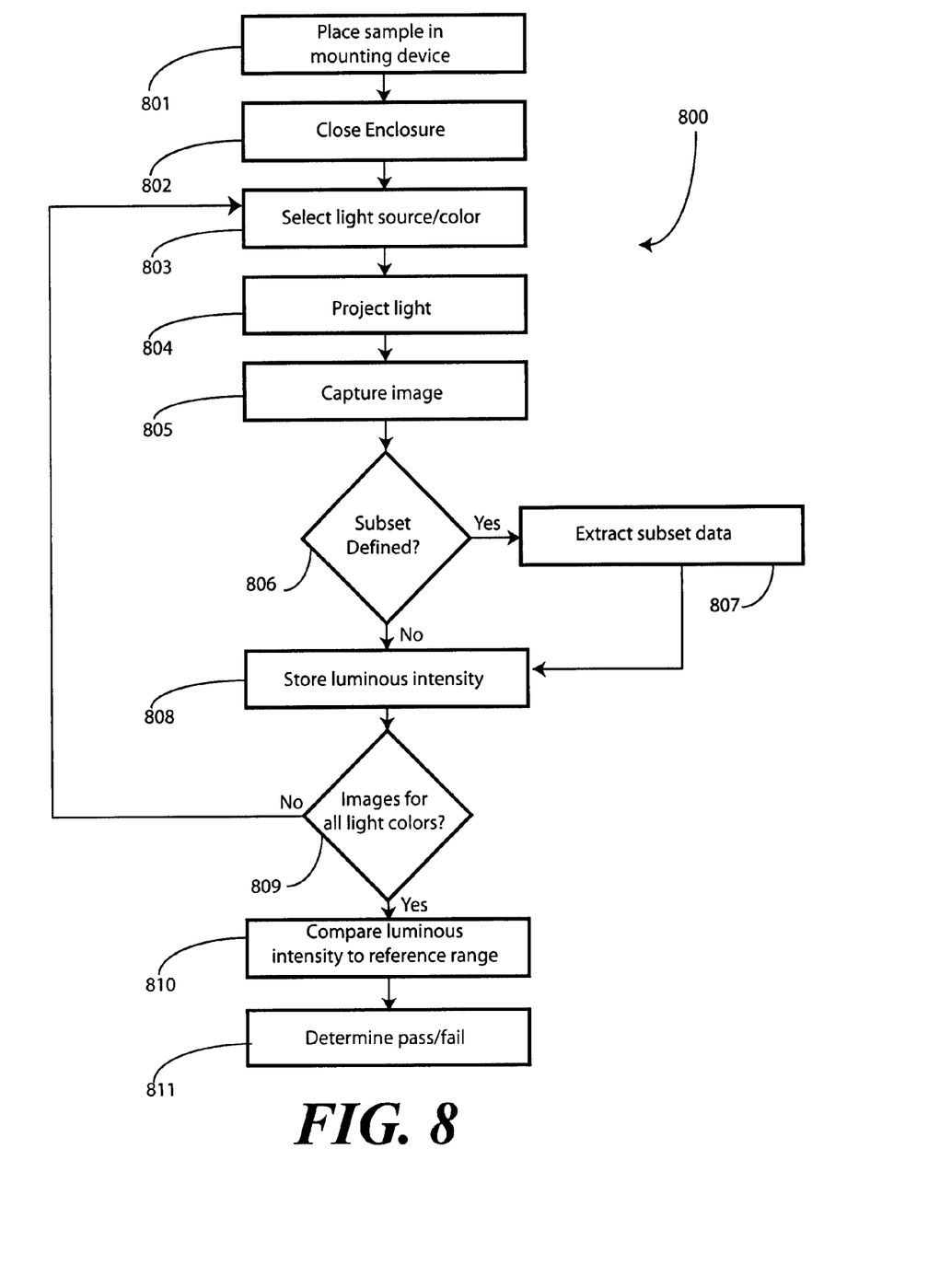
FIG. 8 illustrates one embodiment of a method of carrying out spectrum verification in accordance with the invention.

Turning now to FIG. 8, illustrated therein is one embodiment of a method 800 of determining whether a color of an object is within a predetermined color range, suitable for use with systems described herein, in accordance with embodiments of the invention. The method of FIG. 8 is the "production line" method, in that it is the method used to test sample objects. The calibration method will be described below in reference to FIG. 9.

An engineer or technician first puts the sample object (203) to be tested in the mounting device (225) at step 801. Placing the sample object (203) in the mounting device (225) ensures that the sample object (203) is disposed geometrically relative to the light source (201) and the monochromatic image capture device (202) at the same distance and angle as the reference object (403) was during calibration. Where the system in use employs an enclosure, the enclosure is closed at step 802.

At step 803, the controller (222) selects a light source or a light/filter combination. Specifically, the controller (222) selects a light having a predetermined light wavelength spectrum or color associated therewith. Continuing the red/green/blue LED—single monochromatic image capture device example from above, the controller (222) may first select the red LED. At step 804, the controller (222) then actuates the red LED such that it projects light upon the sample object (203).

At step 805, the monochromatic image capture device (202) captures a first monochromatic image of the sample object (203). The captured image, which in one embodiment is a digital image comprising binary information about the image, includes luminous intensity information. Where two monochromatic image capture devices were used—as was the case in FIG. 5—both image capture devices would capture images at this step. When two image capture devices are used, the second image capture device may capture an image from an alternate angle, as would be the case where the first image capture device captures an image of a reflective region and the second image capture device captures an image of a diffuse region.

At decision 806, the controller (222) checks to see whether the image selection tool (232) has been used to define a subset of the image for analysis. Where it has, the controller (222) extracts luminous intensity information from the image for the selected region at step 807. Where it has not, raw luminous intensity information is analyzed. The data is captured and stored at step 808.

At decision 809, the controller (222) checks to see whether images have been captured with all desired light sources. Again referring to the red/green/blue LED example, since only an image illuminated by the red LED has been captured at this point, the method 800 would return to step 803. The controller would then select a second light having a predetermined wavelength spectrum, which may be the blue LED. At step 804 the controller (222) would project this second light upon the sample object (203). At step 805, the monochromatic image capture device (202) would capture a second monochromatic image of the sample object (203). This second image would have different luminous intensity information from that taken with the LED, as the second image is captured with the blue LED projecting light. Once all of the combinations have been selected and corresponding images captured, the method moves to step 810.

At step 810, the controller (222) compares the luminous intensity information from the images with a predetermined statistical range. As noted above, the predetermined statistical range is determined during calibration and corresponds to a plurality of images taken of a reference object (403). As such, the first image captured would be compared to range corresponding to a plurality of images of the reference object (403) illuminated by the red LED, the second image captured would be compared to a range corresponding to a plurality of images of the reference object (403) illuminated by the blue LED and so forth.

At step 811, the controller (222) determines whether the luminous intensity information associated with each image is within the predetermined statistical range. Thus, the controller (222) determines whether the first image is within the statistical range associated with the red LED, determines whether the second image is within the statistical range associated with the blue LED, and so forth. Each of steps 803, 804, 805, 806, 807, 808, 809, 810, and 811 would be repeated for a third image, where one is taken.

Figure 9:
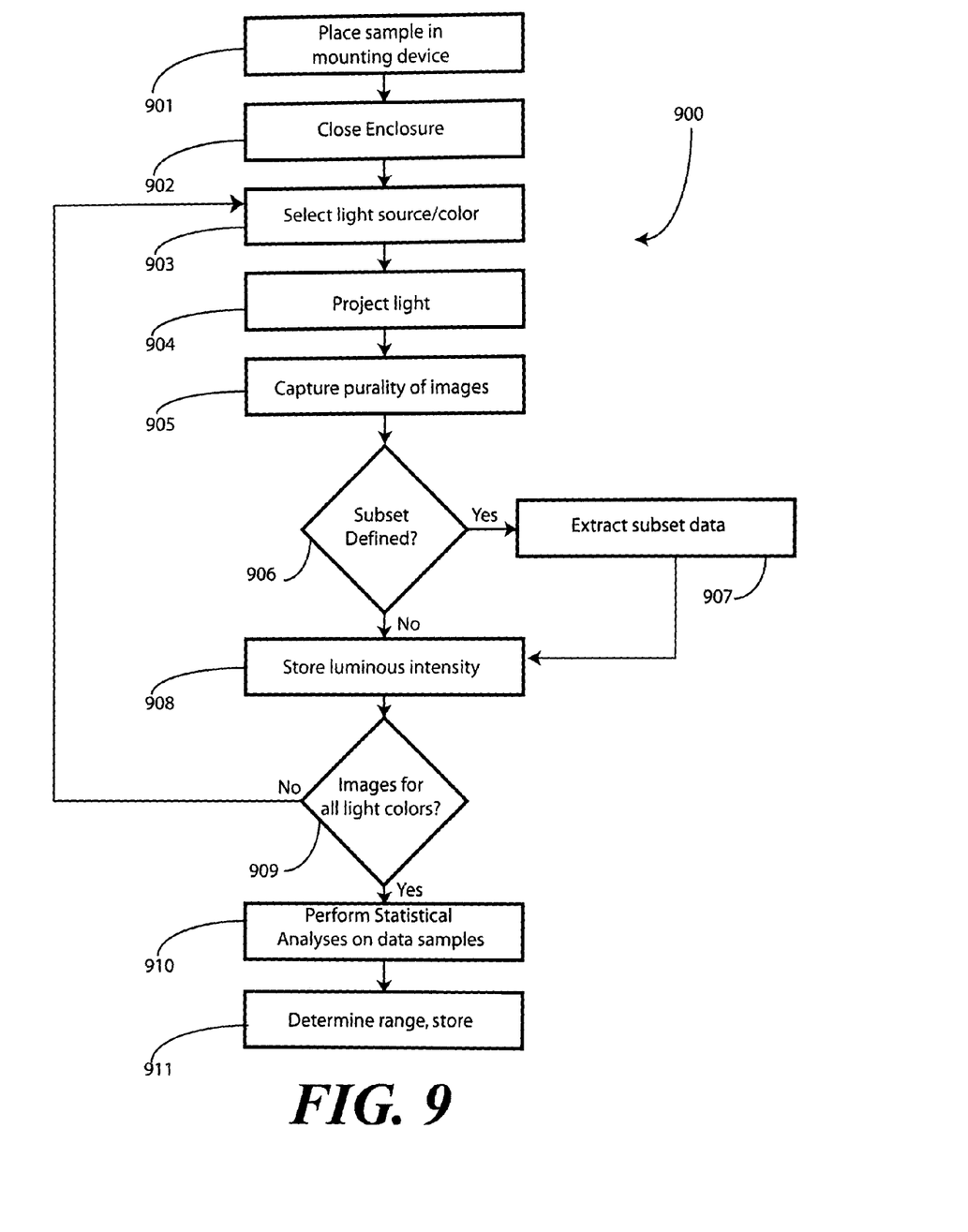
FIG. 9 illustrates one embodiment of a method of calibrating a spectrum verification system in accordance with the invention.

Turning now to FIG. 9, illustrated therein is a method 900 of calibrating a system for determining whether a color of an object is within a predetermined color range in accordance with embodiments of the invention. The method 900 is similar to the test method of FIG. 8. The major differences lie with the number of images captured of the reference object and the processing of the luminous intensity data associated with those images. Note that periodic calibration may be required in the method (800) of FIG. 8 between the testing of samples to ensure that the system stays accurate as light sources degrade.

At step 901, a reference object (403) is placed in the mounting device (225). As noted above, where a light source becomes defective, a sample object may be used as the reference object for a "mini-calibration" process. At step 901, a technician or engineer may additionally visually inspect the reference object (403) when illuminated so as to select a reference region associated with the reference object (403) for measurement. Where one monochromatic image capture device (202) is used, this reference region may be one that is neither too diffuse nor too reflective. Where multiple monochromatic image capture devices (202,502) are used, the reference regions may include reflective and diffuse areas. Additionally, the light source (201) and monochromatic image capture device (202) may be fixed relative to the mounting device (225) at this step. Where an enclosure is used, the enclosure is sealed at step 902.

The controller (222) selects a first light/light-filter combination at step 903. Where the calibration process is a mini-calibration, the controller (222) will select only that light/light-filter combination that has been replaced. The light or light-filter combination has a predetermined light wavelength spectrum associated therewith, such as red, blue, cyan, magenta, green, etc. At step 904, the controller (222) actuates the selected light such that the light projects the predetermined light wavelength spectrum upon the reference object (403).

At step 905, the monochromatic image capture device (202) captures a plurality of images of the object. A plurality of images is captured such that a statistical analysis may be performed on the images. In one embodiment, a set of at least 30 images is captured such that the set of images is large enough that statistically relevant data may be extracted.

At decision 906, the controller (222) determines whether the image selection tool (232) has been used to pinpoint a specific region of the reference object (403) for measurement. Such would be the case, for instance, where a technician or engineer had visually inspected the reference object (403) at step 901 to select a reference region associated with the reference object (403) for measurement. Where this is the case, illumination information from only that reference region is extracted at step 907. Raw illumination information may be analyzed otherwise. This data is extracted and stored at step 908.

At step 909, the controller (222) determines whether all the available light permutations have been used for image capture. For the mini-calibration process, only a single light permutation will be selected—that of the replaced light. As such, during mini-calibration, step 909 will be omitted. Where they have not, the method 900 returns to step 903. Such would be the case where a second light having a second predetermined light wavelength spectrum or color was used. This light would be projected at step 904, and a plurality of images would be captured at step 905. Once all the permutations have been used, the method 900 moves to step 910.

At step 910, the controller (222) determines a predetermined acceptable range of luminous intensities from the luminous intensity information of each reference region of the plurality of images. This range may be determined in any of a number of ways. In one embodiment, the range is determined statistically by six-sigma analysis.

Six-sigma analysis is a statistical tool used to reduce variation in manufacturing and business processes. Processes that fall within six-sigma limits have defect levels below 3.4 defects per (one) million opportunities. For a normally distributed process, to yield less than 3.4 parts per million, a sample must be within 4.5 standard deviations above or below the mean. Thus the analysis of step 910 may include determining the mean and standard deviation of the luminous intensity data from the plurality of images. Range limits may then be set. Other statistical analyses, such as those enabled by QuickSigma or Minitab software may additionally be performed. A different analysis will be performed with each set of image luminous intensity data. As such, one will be performed with the images taken with the first light source, another with the images taken with the second light source, and so on.

Note also that certain analyses may combine image data. For example, formulae combining the luminous intensity information may be determined by looking at the data from each sample set. Complex formulae may serve as the predetermined criterion for passage such as this: In a system using a red light and a blue light, the criterion $Y=-(1/(1+\exp(-f2))-0.5)$, where $f2=Blue/(6+Red-blue)-5$ may be used to determine passage. Where the normalized result is negative, the sample passes. Where the normalized result is positive, the sample fails. This is but one illustrative embodiment. It will be clear to those of ordinary skill in the art having the benefit of this disclosure that other correlations, results, and corresponding predetermined criteria may be determined from the calibration data.

Thus, as shown and described, embodiments of the invention employ one or more monochromatic image capture devices to measure luminous intensity of a sample object illuminated by a light source having a predetermined light wavelength spectrum associated therewith. This data is then compared with a predetermined statistical range determined from a plurality of images of a reference object taken during a calibration process to determine whether the sample object is sufficiently similar in color to the reference object as to ship to a customer. Benefits of the invention include the ability to statistically control processes, the elimination of variable human "eyeball" measurements, and recordation and retention of test data.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A system for determining whether a color of an object is within a predetermined color range, the system comprising:
   a controller;
   a monochromatic image capture device coupled to the controller; and
   a light source coupled to the controller and configured to selectively project one of a plurality of predetermined light wavelength spectrum upon the object;
   wherein the controller is configured to cause the monochromatic image capture device to capture at least a first image of the object while the light source projects a first of the plurality of predetermined light wavelength spectrum, and at least a second image of the object while the light source projects a second of the plurality of predetermined light wavelength spectrum, each image comprising object luminous intensity information; and
   a comparison module configured to determine whether the object luminous intensity information satisfies at least one criterion based upon predetermined reference luminous intensity data.

2. The system of claim 1, wherein the light source comprises one of a plurality of LEDs, with each of the plurality of LEDs having predetermined LED wavelength spectrum associated therewith, each of the predetermined LED wavelength spectrum being distinct from others, or, a plurality of color filters, each of the plurality of color filters having predetermined filter wavelength spectrum associated therewith, each of the predetermined filter wavelength spectrum being distinct from others.

3. The system of claim 1, further comprising a mounting device disposed such that light projected from the light source reflects off the object and to the monochromatic image capture device and configured to position the object at a constant location relative to the light source and the monochromatic image capture device.

4. The system of claim 3, further comprising an enclosure disposed about the monochromatic image capture device, the light source, the mounting device, and the object, wherein the enclosure is configured to prevent ambient light illuminating the object.

5. The system of claim 1, wherein the predetermined reference luminous intensity data comprises calibration data received from a plurality of images of a reference object having a representative reference color.

6. The system of claim 1, wherein the controller comprises an image selection tool configured to facilitate selection of a subset of an image, wherein the object luminous intensity information corresponds to the subset of the image.

7. The system of claim 1, further comprising a second monochromatic image capture device coupled to the controller and configured to capture at least one additional image of the object, the additional image having additional luminous intensity information, wherein the additional luminous intensity information is different from the object luminous intensity information.

8. The system of claim 1, wherein each of the monochromatic image capture device and the light source are disposed at an angle of between 30 and 60 degrees relative to a reference surface of the object.

9. The system of claim 1, further comprising a user interface having a display configured to present a comparison module result to a user, wherein the display is configured to optionally present both a calibration interface and a test interface to the user.

10. A method for determining whether a color of an object is within a predetermined color range, the method comprising the steps of:
    projecting, from a light source, a light having a first predetermined light wavelength spectrum upon the object;
    capturing, with an image capture device, a first monochromatic image of the object having first luminous intensity information associated therewith;
    projecting, from the light source, a light having a second predetermined light wavelength spectrum upon the object;
    capturing, with the image capture device, a second monochromatic image of the object having second luminous intensity information associated therewith; and
    comparing, with a controller operable with the image capture device, each of the first luminous intensity information with a first predetermined statistical range corresponding to a plurality of images of a reference object illuminated by the light having the first predetermined light wavelength spectrum, and comparing the second luminous intensity information to a second statistical range corresponding to a plurality of images of the reference object illuminated by the light having a second predetermined light wavelength spectrum.

11. The method of claim 10, further comprising the step of determining whether the first luminous intensity information is within the first predetermined statistical range and determining whether the second luminous intensity information is within the second predetermined statistical range.

12. The method of claim 10, further comprising the steps of defining a subset of the first monochromatic image and defining a subset of the second monochromatic image, wherein the first luminous intensity information and the second luminous intensity information correspond to a subset of the first monochromatic image and the second monochromatic image, respectively.

13. The method of claim 10, further comprising the steps of: projecting a light having a third predetermined light wavelength spectrum upon the object; and capturing a third monochromatic image of the object having third luminous intensity information associated therewith.

14. The method of claim 13, further comprising the steps of comparing the third luminous intensity information to a third predetermined statistical range corresponding to a plurality of images of the reference object illuminated by the light having the third predetermined light wavelength spectrum and determining whether the third luminous intensity information is within the third predetermined statistical range.

15. The method of claim 10, further comprising the steps of taking a first additional image from an alternate angle of the object when illuminated by the light having the first predetermined light wavelength spectrum, and taking a second additional image from the alternate angle of the object when illuminated by the light having the second predetermined light wavelength spectrum.

16. The method of claim 10, further comprising the step of periodically calibrating the statistical ranges corresponding to a plurality of images of the reference object illuminated by the light having the first predetermined light wavelength spectrum and the second statistical range corresponding to a plurality of images of the reference object illuminated by the light having a second predetermined light wavelength spectrum.

17. A method in a system of calibrating a system for determining whether a color of an object is within a predetermined color range, the method comprising the steps of:
projecting, with a light source, a light having a predetermined light wavelength spectrum upon at least a reference region of a reference object having a reference color;
capturing, with an image capture device, a plurality of monochromatic images of the object, each image having luminous intensity information associated therewith; and
determining, with a controller, a predetermined acceptable range of luminous intensities from the luminous intensity information of each reference region of the plurality of monochromatic images.

18. The method of claim 17, wherein the plurality of images comprises at least 30 images.

19. The method of claim 17, further comprising the steps of:
projecting a light having a second predetermined light wavelength spectrum upon the reference object;
capturing a second plurality of monochromatic images of the object, each image having second luminous intensity information; and
determining a second predetermined acceptable range of luminous intensities from the second luminous intensity information corresponding to a reference region of each of the second plurality of monochromatic images.

20. The method of claim 16, wherein the predetermined acceptable range of luminous intensities comprises a predetermined number of standard deviation values from a mean luminous intensity of reference regions of the plurality of monochromatic images of the object.

* * * * *